(12) United States Patent
Kim (10) Patent No.: US 10,404,424 B2
(45) Date of Patent: Sep. 3, 2019

(54) HUB APPARATUS AND METHOD FOR CONTROLLING THE SAME

(71) Applicants: HYUNDAI MOTOR COMPANY, Seoul (KR); KIA MOTORS CORPORATION, Seoul (KR)

(72) Inventor: Joon Young Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 40 days.

(21) Appl. No.: 15/798,068

(22) Filed: Oct. 30, 2017

(65) Prior Publication Data

US 2018/0367264 A1 Dec. 20, 2018

(30) Foreign Application Priority Data

Jun. 15, 2017 (KR) ........................ 10-2017-0075836

(51) Int. Cl.
*H04L 5/00* (2006.01)
*H04L 12/44* (2006.01)
*H04L 29/08* (2006.01)

(52) U.S. Cl.
CPC ............ *H04L 5/0001* (2013.01); *H04L 12/44* (2013.01); *H04L 67/12* (2013.01); *H04L 2012/445* (2013.01)

(58) Field of Classification Search
CPC . H04L 5/0001; H04L 12/44; H04L 2012/445; H04L 67/12
See application file for complete search history.

(56) References Cited

U.S. PATENT DOCUMENTS

| 9,510,347 | B2* | 11/2016 | Thubert | H04W 40/22 |
| 9,622,106 | B2* | 4/2017 | Yu | H04L 5/0007 |
| 9,774,534 | B2* | 9/2017 | Vasseur | H04L 47/12 |
| 2011/0194407 | A1 | 8/2011 | Ji et al. | |
| 2017/0006595 | A1* | 1/2017 | Zakaria | H04L 67/12 |

FOREIGN PATENT DOCUMENTS

| KR | 10-2005-0017652 A | 2/2005 |
| KR | 10-1454003 B1 | 10/2014 |
| KR | 10-1556155 B1 | 10/2015 |

* cited by examiner

*Primary Examiner* — Curtis A Alia
(74) *Attorney, Agent, or Firm* — Morgan, Lewis & Bockius LLP

(57) ABSTRACT

A hub apparatus and a method for controlling the same are provided for efficiently managing a frequency slot or a time slot in communication between at least one hub apparatus and at least one device. The hub apparatus includes a communicator configured to receive a communication signal from at least one device; a controller configured to allocate time slots for the at least one device on the basis of the communication signal received from the at least one device, and when the communicator receives a communication signal from a new device other than the at least one device, transmit a control signal for reallocating time slots for at least one device having the new device; and a memory configured to store data that is associated with a communication frequency, a use amount of time slots, and a communication signal strength of the at least one device.

14 Claims, 12 Drawing Sheets

| DEVICE | Time Slot |
|---|---|
| DEVICE 1 | 1, 11 ⋯ |
| DEVICE 2 | 3, 9 ⋯ |
| DEVICE 3 | 5, 14 ⋯ |
| DEVICE 4 | 2, 12 ⋯ |
| DEVICE 5 | 7, 16 ⋯ |
| DEVICE 6 | 6, 10 ⋯ |
| DEVICE 7 | 4, 15 ⋯ |
| DEVICE 8 | 8, 13 ⋯ |

| DEVICE | Time Slot |
|---|---|
| DEVICE 1 | 1, 11 ⋯ |
| DEVICE 2 | 3, 9 ⋯ |
| DEVICE 3 | 5, 14 ⋯ |
| DEVICE 4 | 2, 12 ⋯ |
| DEVICE 5 | 7, 16 ⋯ |
| DEVICE 6 | 6, 10 ⋯ |
| DEVICE 7 | 4, 15 ⋯ |
| DEVICE 8 | 8, 13 ⋯ |

| DEVICE | Time Slot |
|---|---|
| DEVICE 1 | 1, 13 |
| DEVICE 2 | 4, 9, 18, 19, 21, 22 |
| DEVICE 3 | 5, 12, 15, 17 |
| DEVICE 4 | 7, 11, 16 |
| DEVICE 5 | 8, 10, 14, 20, 23, 24 |
| DEVICE 6 | 3 |
| DEVICE 7 | 2 |
| DEVICE 8 | 6 |

< TIME-SLOT REALLOCATION >

< TIME-SLOT REALLOCATION >

| DEVICE | FIRST HUB APPARATUS : TIME SLOT |
|---|---|
| DEVICE 1 | 1, 11 |
| DEVICE 2 | 3, 9 |
| DEVICE 3 | 5, 14 |
| DEVICE 4 | 2, 12 |
| DEVICE 5 | 7, 16 |
| DEVICE 6 | 6, 10 |
| DEVICE 7 | 4, 15 |
| DEVICE 8 | 8, 13 |

(a)

| DEVICE | FIRST HUB APPARATUS : TIME SLOT |
|---|---|
| DEVICE 1 | 1, 9 |
| DEVICE 2 | 3, 7 |
| DEVICE 3 | 5, 6 |
| DEVICE 4 | 2, 8 |
| DEVICE 5 | 4, 10 |
| DEVICE 6 | |
| DEVICE 7 | |
| DEVICE 8 | |

(b)

| DEVICE | SECOND HUB APPARATUS : TIME SLOT |
|---|---|
| DEVICE 1 | |
| DEVICE 2 | |
| DEVICE 3 | |
| DEVICE 4 | |
| DEVICE 5 | |
| DEVICE 6 | 1, 5 |
| DEVICE 7 | 3, 4 |
| DEVICE 8 | 2, 6 |

| DEVICE | RSSI (FIRST HUB APPARATUS) |
|---|---|
| DEVICE 1 | -65 dBm |
| DEVICE 2 | -71 dBm |
| DEVICE 3 | -58 dBm |
| DEVICE 4 | -73 dBm |
| DEVICE 5 | -68 dBm |
| DEVICE 6 | -75 dBm |
| DEVICE 7 | -74 dBm |
| DEVICE 8 | -66 dBm |

( a )

| DEVICE | RSSI (SECOND HUB APPARATUS) |
|---|---|
| DEVICE 1 | -71 dBm |
| DEVICE 2 | -77 dBm |
| DEVICE 3 | -73 dBm |
| DEVICE 4 | -80 dBm |
| DEVICE 5 | -70 dBm |
| DEVICE 6 | -55 dBm |
| DEVICE 7 | -54 dBm |
| DEVICE 8 | -46 dBm |

( b )

HUB APPARATUS AND METHOD FOR CONTROLLING THE SAME

CROSS-REFERENCE TO RELATED APPLICATION

The present application is based on and claims the benefit of priority to Korean Patent Application No. 10-2017-0075836, filed on Jun. 15, 2017 with the Korean Intellectual Property Office, the disclosure of which is incorporated herein by reference.

TECHNICAL FIELD

Embodiments of the present disclosure relate to a hub apparatus and a method for controlling the same, and more particularly to a technology capable of efficiently managing a frequency slot or a time slot in communication between at least one hub apparatus and at least one device.

BACKGROUND

The Internet has been basically developed to allow computers handled by users to communicate with one another through Transmission Control Protocol/Internet Protocol (TCP/IP). However, many developers and companies are conducting intensive research on technology for allowing all things capable of performing identification, calculation, and communication to communicate with each other over the Internet. In this way, technology for allowing all things to communicate with each other will hereinafter be referred to as Internet of Things (IoT).

The IoT is more evolved than the Internet based on typical wired communication or the mobile Internet, and is similar to Ubiquitous or Machine to Machine (M2M) because devices connected to the Internet communicate with each other without intervention of person such that things may communicate with each other without depending on the person. The IoT may refer to information communication technology which connects all things existing in the world to the network by extending M2M to the Internet such that all the things may communicate with each other from anywhere at any time.

Although the IoT has been established centering around home IoT having a relatively small number of risk factors, the IoT will be extended to vehicles, industrial sites, hospitals, etc. once the reliability of the IoT is guaranteed in the future.

For implementation of the IoT, a hub and devices corresponding to the things communicate with each other. Recently, assuming that at least one hub and at least one device are present, a method for implementing efficient communication between the at least one hub device and the at least one device needs to be researched and developed.

SUMMARY

One aspect of the present disclosure is to provide a technology for allocating time slots to each device to implement efficient communication between at least one hub device and at least one device, and distributing connection between the at least one hub device and the at least one device.

Additional aspects of the invention will be set forth in part in the description which follows and, in part, will be obvious from the description, or may be learned by practice of the invention.

In accordance with one aspect of the present disclosure, a hub apparatus includes: a communicator configured to receive a communication signal from at least one device; a controller configured to allocate time slots for the at least one device on the basis of the communication signal received from the at least one device, and when the communicator receives a communication signal from a new device other than the at least one device, transmit a control signal for reallocating time slots for at least one device having the new device; and a memory, to which the controller is coupled, configured to store data that is associated with a communication frequency, a use amount of time slots, and a communication signal strength of the at least one device.

The communicator may receive a communication signal from at least one new hub apparatus other than the hub apparatus. The controller may transmit a control signal for reallocating time slots for the at least one device upon receiving the communication signal from the at least one new hub apparatus.

The hub apparatus may be a first hub device, the at least one new hub apparatus may include a second hub device.

When the communicator receives a communication signal from the new device, the controller may block communication between the at least one device having the new device and the hub apparatus, and may reallocate time slots for the at least one device having the new device on the basis of data stored in the memory.

The controller may change a number of the reallocated time slots on the basis of the communication frequency and the use amount of time slots of the at least one device having the new device.

When the communicator receives a communication signal from the second hub device, the controller may block communication between the at least one device and the first hub device, and may transmit a control signal for reallocating time slots for the at least one device on the basis of data stored in the memory.

The controller may compare each of a communication signal strength between the at least one device and the first hub device and a communication signal strength between the at least one device and the second hub device with data associated with a communication signal strength pre-stored in the memory, and may reallocate time slots for the at least one device according to the result of comparison.

When a communication signal strength between the at least one device and the first hub device is higher than a communication signal strength between the at least one device and the second hub device, the controller may transmit a control signal for reallocating time slots of the first hub device to the at least one device.

When a communication signal strength between the at least one device and the second hub device is higher than a communication signal strength between the at least one device and the first hub device, the controller may transmit a control signal for reallocating time slots of the second hub device to the at least one device.

The communicator may transmit the control signal transmitted from the controller to the second hub device, and may receive a control signal transmitted from the second hub device in association with time-slot reallocation of the at least one device.

In accordance with another aspect of the present disclosure, a method for controlling a hub apparatus may include steps of: receiving, by a communicator, a communication signal from at least one device; allocating, by a controller, time slots for the at least one device on the basis of the communication signal received from the at least one device; receiving, by the communicator, a communication signal from a new device other than the at least one device; and transmitting, by the controller, a control signal for reallocating time slots for at least one device having the new device.

The method may further include: receiving, by the communicator, a communication signal from at least one new hub apparatus other than the hub apparatus. The step of transmitting a control signal for reallocating time slots may include: transmitting a control signal for reallocating time slots for the at least one device when receiving the communication signal from the at least one new apparatus.

The hub apparatus may be a first hub device, and the at least one new hub apparatus may include a second hub device.

The method may further include: storing, by a memory, data that is associated with a communication frequency, a use amount of time slots, and a communication signal strength of the at least one device. The step of transmitting a control signal for reallocating time slots may include: when receiving a communication signal from the new device, blocking communication between the at least one device having the new device and the hub apparatus, and reallocating time slots for the at least one device having the new device on the basis of the stored data.

The method may further include: changing, by the controller, a number of the reallocated time slots on the basis of a communication frequency and a use amount of time slots of the at least one device having the new device.

The step of transmitting a control signal for reallocating time slots may include: when receiving a communication signal from the second hub device, blocking communication between the at least one device and the first hub device, and transmitting a control signal for reallocating time slots for the at least one device on the basis of data stored in a memory.

The step of transmitting a control signal for reallocating time slots may include: comparing each of a communication signal strength between the at least one device and the first hub device and a communication signal strength between the at least one device and the second hub device with data associated with a communication signal strength pre-stored in a memory; and reallocating time slots for the at least one device according to the result of comparison.

The step of transmitting a control signal for reallocating time slots may include: when a communication signal strength between the at least one device and the first hub device is higher than a communication signal strength between the at least one device and the second hub device, transmitting a control signal for reallocating time slots of the first hub device to the at least one device.

The transmitting the control signal for reallocating the time slots may include: when a communication signal strength between the at least one device and the second hub device is higher than a communication signal strength between the at least one device and the first hub device, transmitting a control signal for reallocating time slots of the second hub device to the at least one device.

The method may further include: transmitting the transmitted control signal to the second hub device; and receiving a control signal transmitted from the second hub device in association with time-slot reallocation of the at least one device.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout. It should be noted that the specification of the present disclosure does not describe all the constituent elements of the embodiments, and general matters well known to those skilled in the art and redundant matters of the embodiments will not be described herein for clarity.

Throughout the specification of the present disclosure, terms " . . . part", " . . . module", " . . . member", " . . . block", and the like mean an element capable of being implemented by hardware, software, or a combination thereof. As used in the specification and appended claims, the term " . . . parts", " . . . modules", " . . . members", or " . . . blocks" may be implemented by a single constituent element, or the term " . . . part", " . . . module", " . . . member", or " . . . block" may include a plurality of constituent elements.

Throughout the specification of the present disclosure, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the specification of the present disclosure, if it is assumed that a certain part includes a certain component, the term "comprising or including" means that a corresponding component may further include other components unless context clearly indicates otherwise.

In description of the present disclosure, the terms "first" and "second" may be used to describe various components, but the components are not limited by the terms. These terms may be used to distinguish one component from another component.

The terms "a", "an", "one", "the" and other similar terms include both singular and plural forms, unless context clearly dictates otherwise.

Identification numbers for use in respective operations to be described later are used for convenience of description and better understanding of the present disclosure, do not describe the order or sequence of the respective operations of the present disclosure, and the respective operations of the present disclosure may be carried out in a different way from the order written in the present disclosure, unless context of each operation clearly indicates a specific order.

The principles of the present disclosure and the embodiments of the present disclosure will hereinafter be described with reference to the attached drawings.

Figure 1:
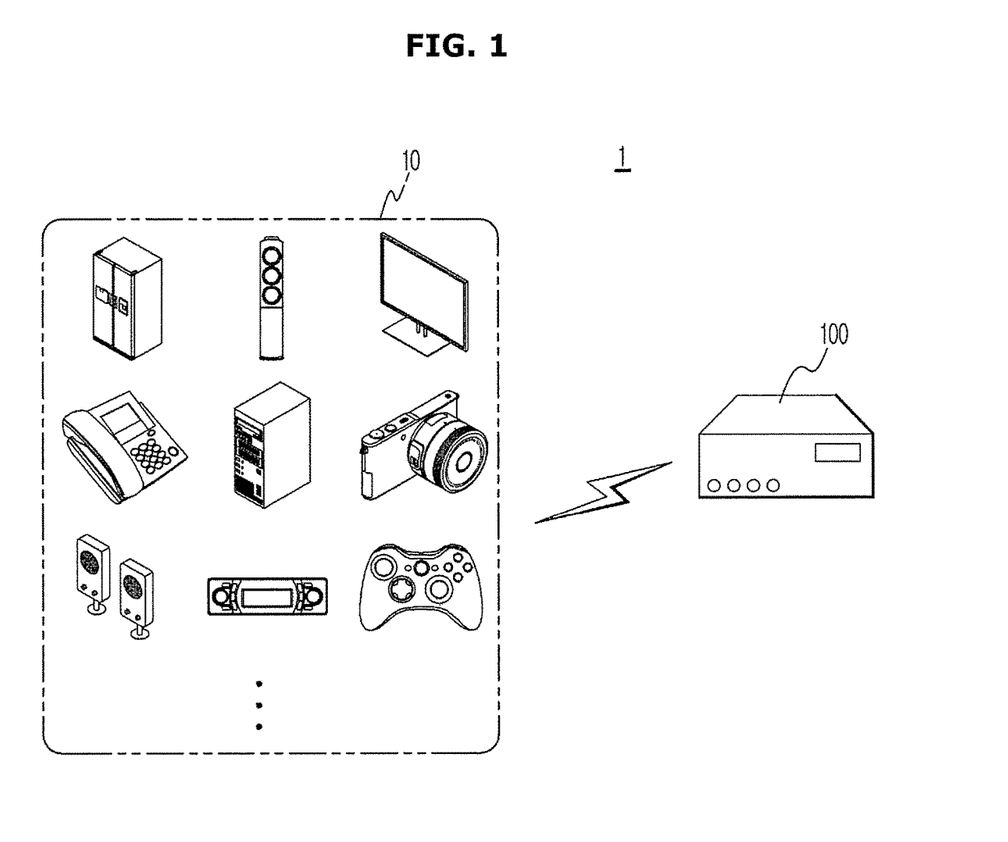
FIG. 1 is a conceptual diagram illustrating an IoT communication system according to an embodiment of the present disclosure.

FIG. 1 is a conceptual diagram illustrating an IoT communication system according to an embodiment of the present disclosure.

Referring to FIG. 1, an IoT system 1 may include at least one IoT device 10 (hereinafter referred to as "at least one device" 10), and a hub device 100 configured to communicate with the at least one IoT device 10.

The term "Internet of Things (IoT)" may refer to intelligent technology and intelligent services which interconnect all things over the Internet such that communication between a person and each thing and communication between plural things may be implemented. There are various technical elements capable of implementing the above-mentioned IoT technology and service, for example, sensing technology capable of acquiring necessary information from tangible things and the ambient environment, wired/wireless communication and network infrastructure technology capable of supporting things to be connected to the Internet, service interface technology capable of fabricating/processing information to be appropriate for various service fields and types or fusion of various technologies, and security technology capable of preventing hacking or leakage of IoT constituent elements such as large amounts of data.

The IoT devices 10 capable of being connected to the network over IoT may include home appliances (e.g., a washing machine, a refrigerator, a microwave oven, a TV, an air-conditioner, and the like) and all other things (e.g., a digital camera, a computer, a laptop, various sensors, a vehicle audio player, a digital meter, a door lock, a game console, a speaker, a security device, and the like). In addition, various modules and sensors embedded in the vehicle may also be within the scope of "things", and the categories of the things are not limited thereto.

In order to implement the IoT communication environment, the hub device 100 configured to communicate with the plurality of devices 10 as well as to connect to a network server is needed. Although not shown in FIG. 1, the plurality of devices 10 may be connected to the network server through the hub device 100, and the IoT may be implemented using a frequency slot or time slot allocated from the hub device 100.

The IoT may be implemented between the plurality of devices 10, or may be implemented through the network server connected through the hub device 100.

The hub device 100 may allocate a frequency slot or a time slot to the plurality of devices 10, and may sense the frequency slot or the time slot used by the plurality of devices 10.

The hub device 100 may communicate with the devices 10 using at least one of various communication methods, for example, a Wireless Fidelity (Wi-Fi) scheme, a Bluetooth scheme, a near field communication (NFC) scheme, a ZigBee scheme, and a Z-wave scheme. In accordance with the ZigBee scheme, the hub device 100 may include a coordinator for establishing the network, and a router for extending the network and transmitting a multi-hop routing message. In accordance with the Wi-Fi or Bluetooth scheme, the hub device 100 may first transmit various kinds of connection information (e.g., SSID, session key, etc.) to the devices 10, such that the hub device 100 may transmit and receive various kinds of information to and from the devices 10. In addition, the hub device 100 may communicate with each of the devices 10 using at least one communication scheme.

Figure 2:
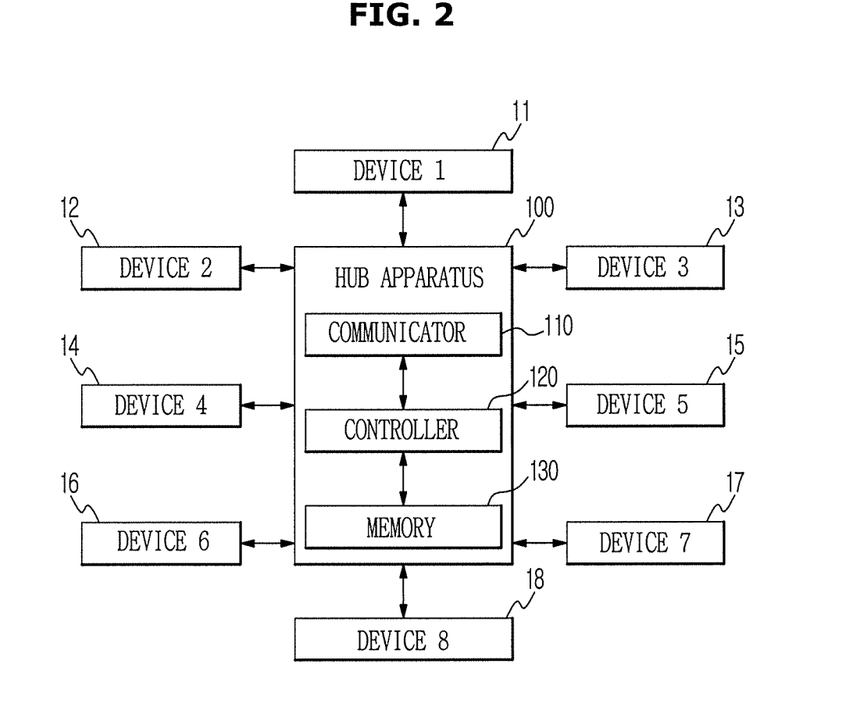
FIG. 2 is a block diagram illustrating a hub device according to an embodiment of the present disclosure.
Figure 3:
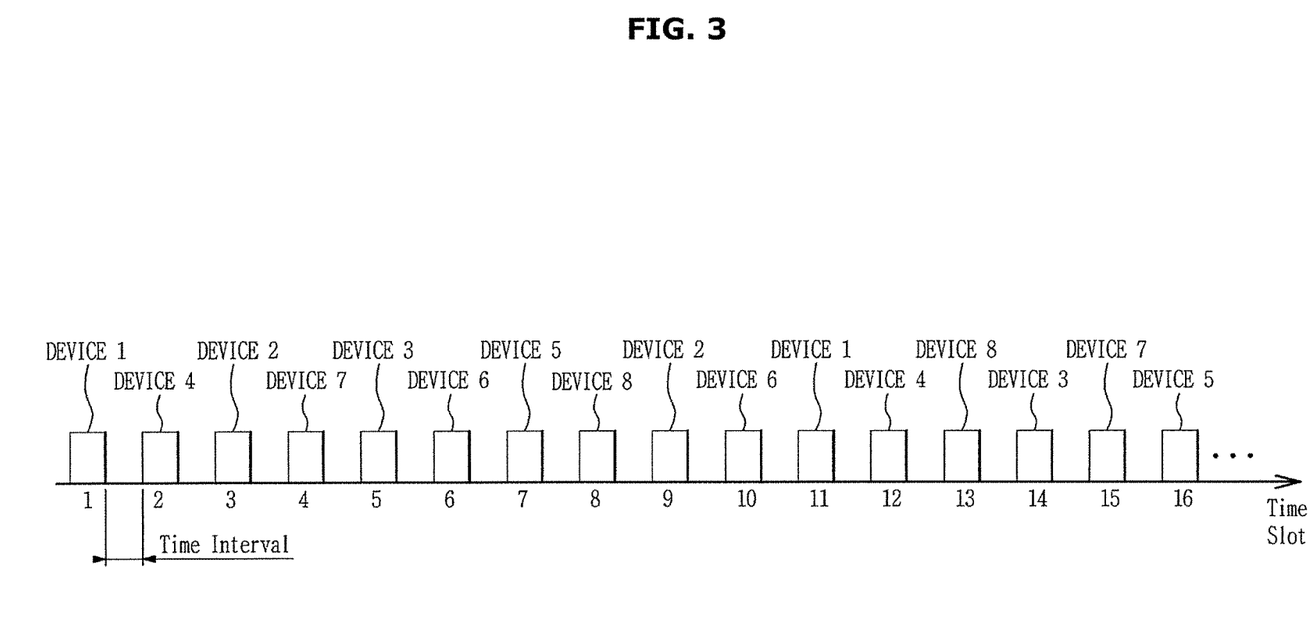
FIG. 3 is a conceptual diagram illustrating that the hub device distributes time slots to a plurality of devices according to an embodiment of the present disclosure.
Figure 4:
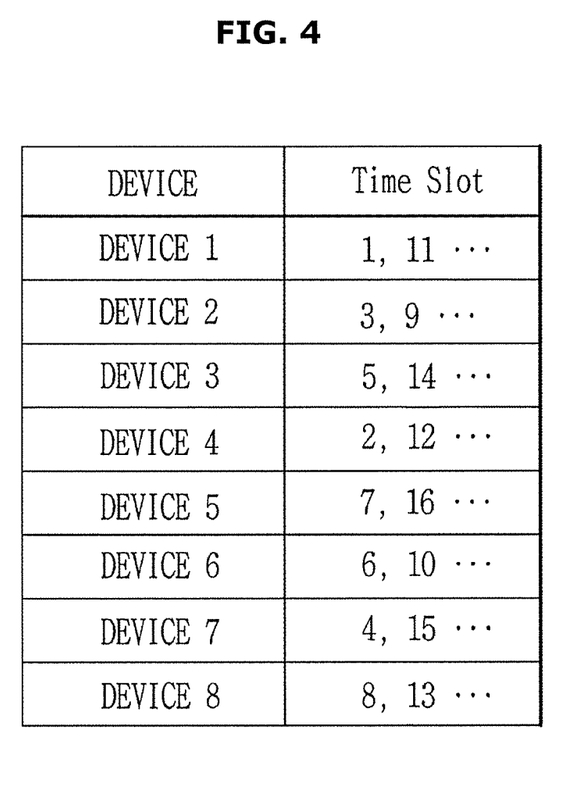
FIG. 4 is a table illustrating time slots distributed to a plurality of devices by the hub device according to an embodiment of the present disclosure.
Figure 5A:
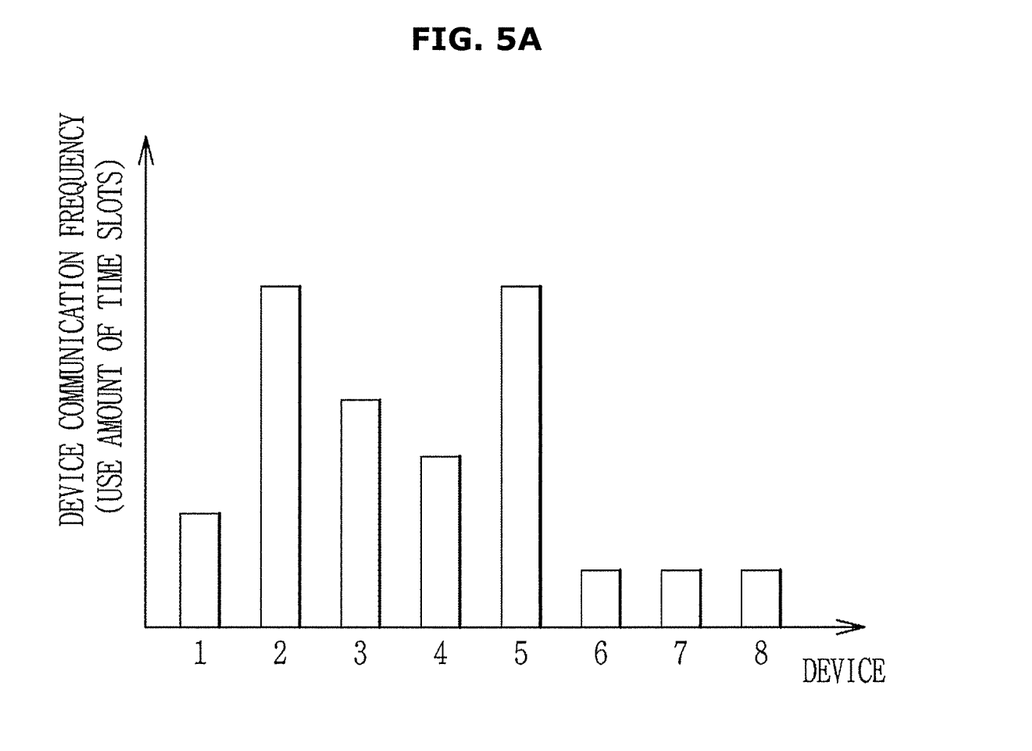
FIGS. 5A and 5B are tables illustrating that the hub device redistributes time slots to devices according to communication frequency or communication amount of the devices.
Figure 5B:
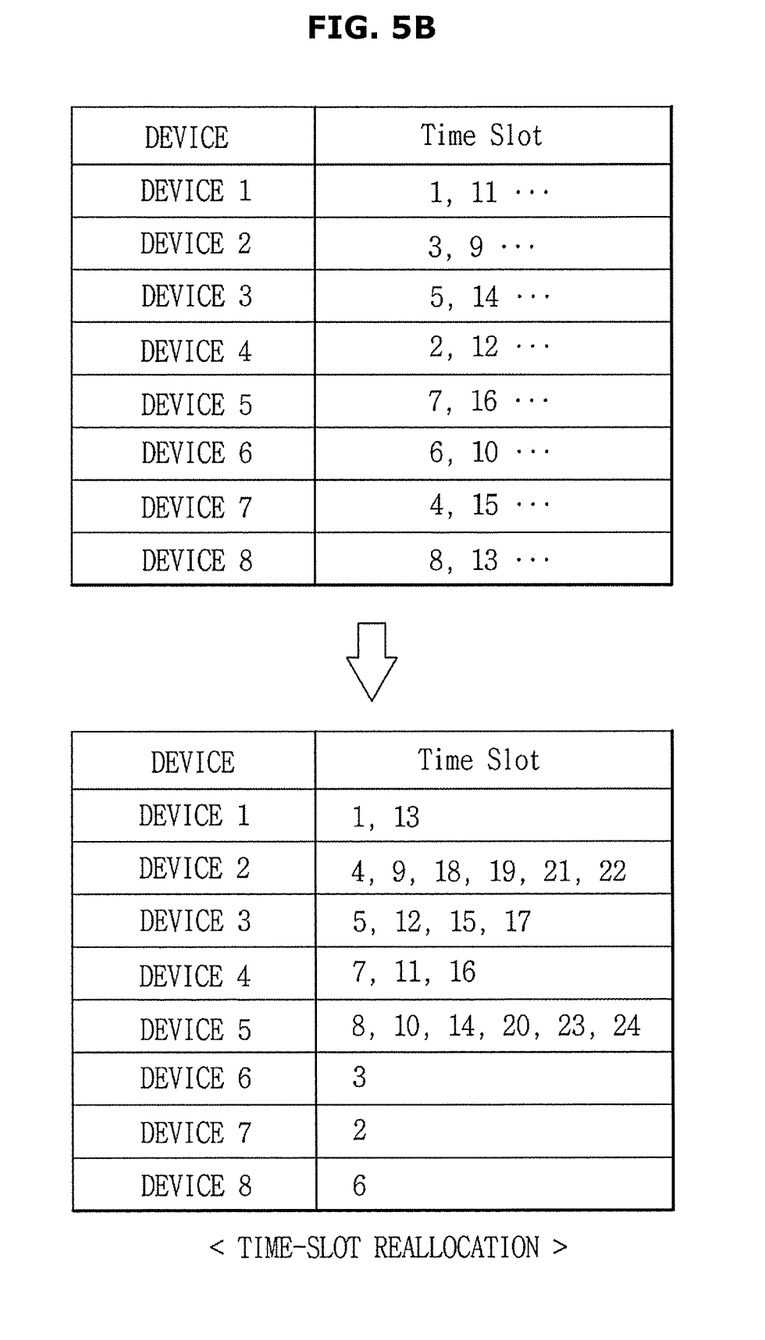

FIG. 2 is a block diagram illustrating a hub device according to an embodiment of the present disclosure. FIG. 3 is a conceptual diagram illustrating that the hub device distributes time slots to a plurality of devices according to an embodiment of the present disclosure. FIG. 4 is a table illustrating time slots distributed to a plurality of devices by the hub device according to an embodiment of the present disclosure. FIGS. 5A and 5B are tables illustrating that the hub device redistributes time slots to devices according to communication frequency or communication amount of the devices.

Referring to FIG. 2, the hub device 100 according to one embodiment of the present disclosure may communicate with the plurality of devices (Device 1 to Device 8). Although FIG. 2 exemplarily discloses eight devices for convenience of description and better understanding of the present disclosure, the number of devices is not limited thereto.

The hub device 100 may include a communicator 110 to communicate with the first to eighth devices (Device 1 to Device 8) 11 to 18; a controller 120 to control the hub device 100; and a memory 130 to store data needed to operate the hub device 100.

The communicator 110 is a hardware device implemented with various electronic circuits to transmit and receive signals via wireless or landline connections.

The controller 120 is an electric circuitry that executes instructions of software which thereby performs various functions described hereinafter.

Although the memory 130 may be implemented as any one of a non-volatile memory (e.g., a cache, a Read Only Memory (ROM), a Programmable ROM (PROM), an Erasable Programmable ROM (EPROM), an Electrically Erasable Programmable ROM (EEPROM), a flash memory, etc.), a volatile memory (e.g., a Random Access Memory (RAM)), and a storage medium (e.g., a Hard Disk Drive (HDD), a CD-ROM, etc.), the scope or spirit of the present disclosure is not limited thereto.

A method for distributing time slots to the plurality of devices by the hub device 100 according to one embodiment of the present disclosure will hereinafter be described with reference to FIGS. 3 to 5B.

The hub device 100 may detect the frequency slot or the time slot of at least one device (Device 1 to Device 8) connected to the hub device 100. That is, at least one device may implement the IoT by connecting to the hub device 100, such that communication between the devices or communication between each device and the hub device 100 may be implemented during the IoT.

When at least one device is connected to the hub device 100 and each device implements the IoT, different time slots may be allocated to the respective devices so as to reduce waste of information caused by interference phenomenon encountered when the plurality of devices simultaneously transmit information. That is, according to a TDMA (Time Division Multiple Access)-based IoT system, the hub device 100 may allocate time slots to at least one device, such that information regarding devices for each allocated time slot may be communicated with the hub device 100.

The hub device 100 may allocate time slots to at least one device, and the time slots may be equally allocated to the respective devices. That is, the hub device 100 may arbitrarily allocate time slots to at least one device connected to the hub device 100. In this case, an equal number of time slots may be allocated to the respective devices, and a time interval may be equally distributed to the respective time slots.

Referring to FIGS. 3 and 4, the hub device 100 may equally distribute the first to eighth devices (Device 1 to Device 8) 11 to 18 to time slots (Time Slot 1 to Time Slot 16). That is, Device 1 may be allocated to Time Slot 1 and Time Slot 11, and Device 2 may be allocated to Time Slot 3 and Time Slot 9, such that the same number of time slots may be allocated to each of the devices (Device 1 to Device 8). In addition, as shown in FIG. 3, a time interval may be equally distributed to the respective time slots. For example, the time interval between the time slots may be 100 ms.

Devices connected to the hub device 100 may communicate with each other through the allocated time slots, or may communicate with each other through the hub device 100 and the network server. At least one device may transmit and receive communication information through the allocated time slots, resulting in no interference of information.

Devices to which time slots are allocated may or may not communicate with each other, or may or may not communicate with each other through the hub device 100 and the network server. That is, although the devices are allocated time slots, the time slots for the devices that do not perform communication may be considered unused.

The memory 130 may store data related to a communication frequency, the use amount of time slots, and communication signal strength of at least one device connected to the hub device 100. That is, the memory 130 may store data indicating how many times the at least one device transmits and receives information through the allocated time slots, or may store data indicating how much information is transmitted and received from the at least one device through the allocated time slots.

The controller 120 of the hub device 100 may change the number of time slots allocated to at least one device on the basis of data related to the device communication frequency and the use amount of time slots stored in the memory 130. As shown in FIG. 5A, the communication frequency or the use amount of time slots of each of the devices (Device 1 (11) to Device 8 (18)) may be changed on the basis of the equally allocated time slots. Referring to FIG. 5A, Device 2 (12) and Device 5 (16) may have the highest communication frequency, and Device 6 (16), Device 7 (17), and Device 8 (18) may have the lowest communication frequency.

Therefore, the controller 120 may discriminate between one device having a high communication frequency or a high use amount of time slots and the other device having a low communication frequency or a low use amount of time slots, and may change the number of time slots allocated to each device.

Referring to FIG. 5B, the controller 120 may change the number of time slots allocated to each device on the basis of the communication frequency or the use amount of time slots of each device.

Although the same number of time slots is allocated to each of the devices (Device 1 (11) to Device 8 (18)) as shown in FIG. 4, a relatively high number of time slots is allocated to each device (Device 2 (12) to Device 5 (15)) having a high communication frequency on the basis of the communication frequency of each device, and a relatively small number of time slots is allocated to each device (Device 6 (16) to Device 8 (18)) having a low communication frequency as can be seen from FIG. 5B.

That is, the controller 120 may reallocate time slots on the basis of the communication frequency or the use amount of time slots of at least one device, and each device may communicate with another through the allocated time slots.

Figure 6:
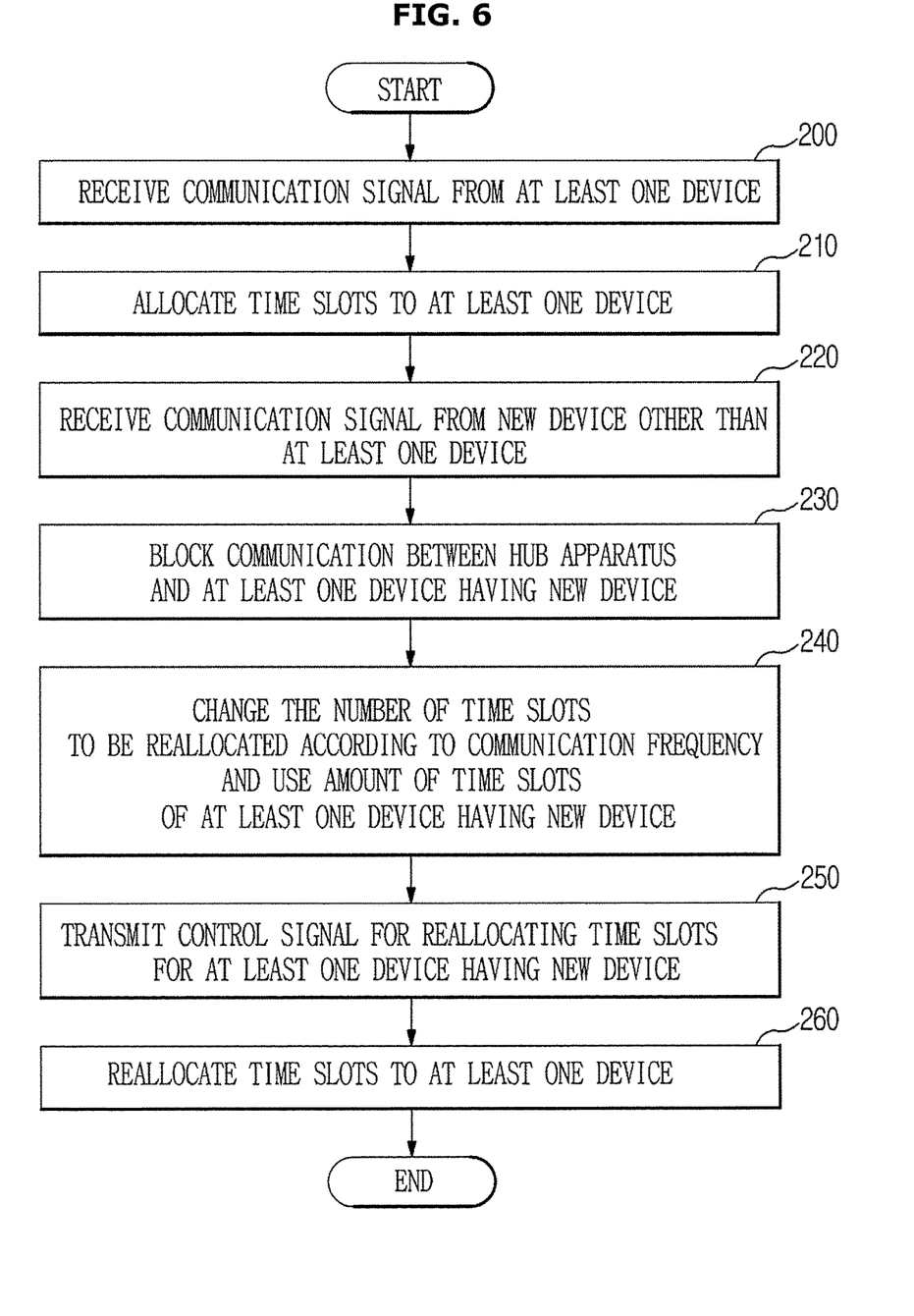
FIG. 6 is a flowchart illustrating a method for redistributing time slots of the hub device using a new device when the new device is connected to the hub device according to an embodiment of the present disclosure.
Figure 7:
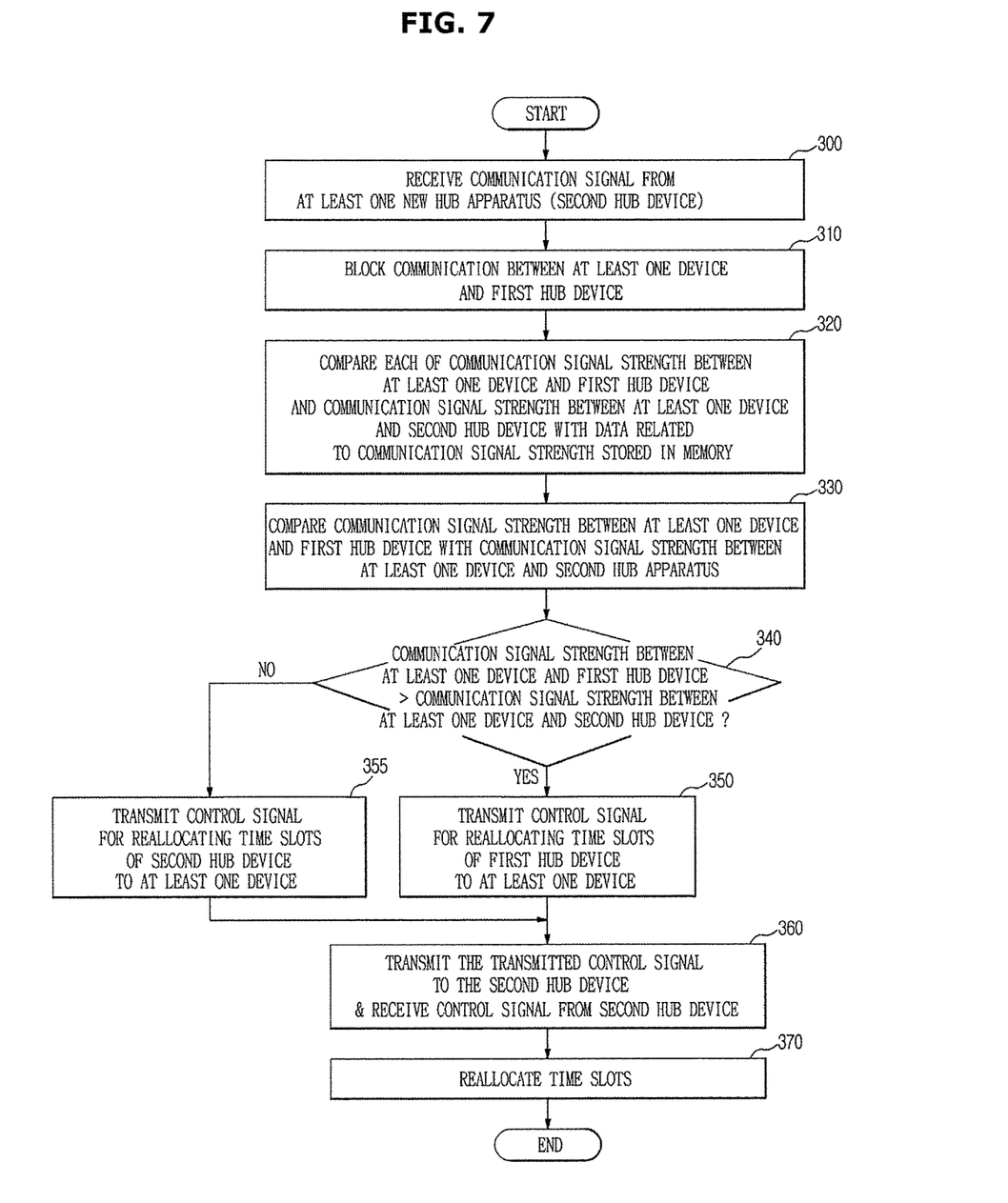
FIG. 7 is a flowchart illustrating the connection relationship among a conventional hub device, a new hub device, and devices and a method for redistributing time slots when the new hub device is added.
Figure 8:
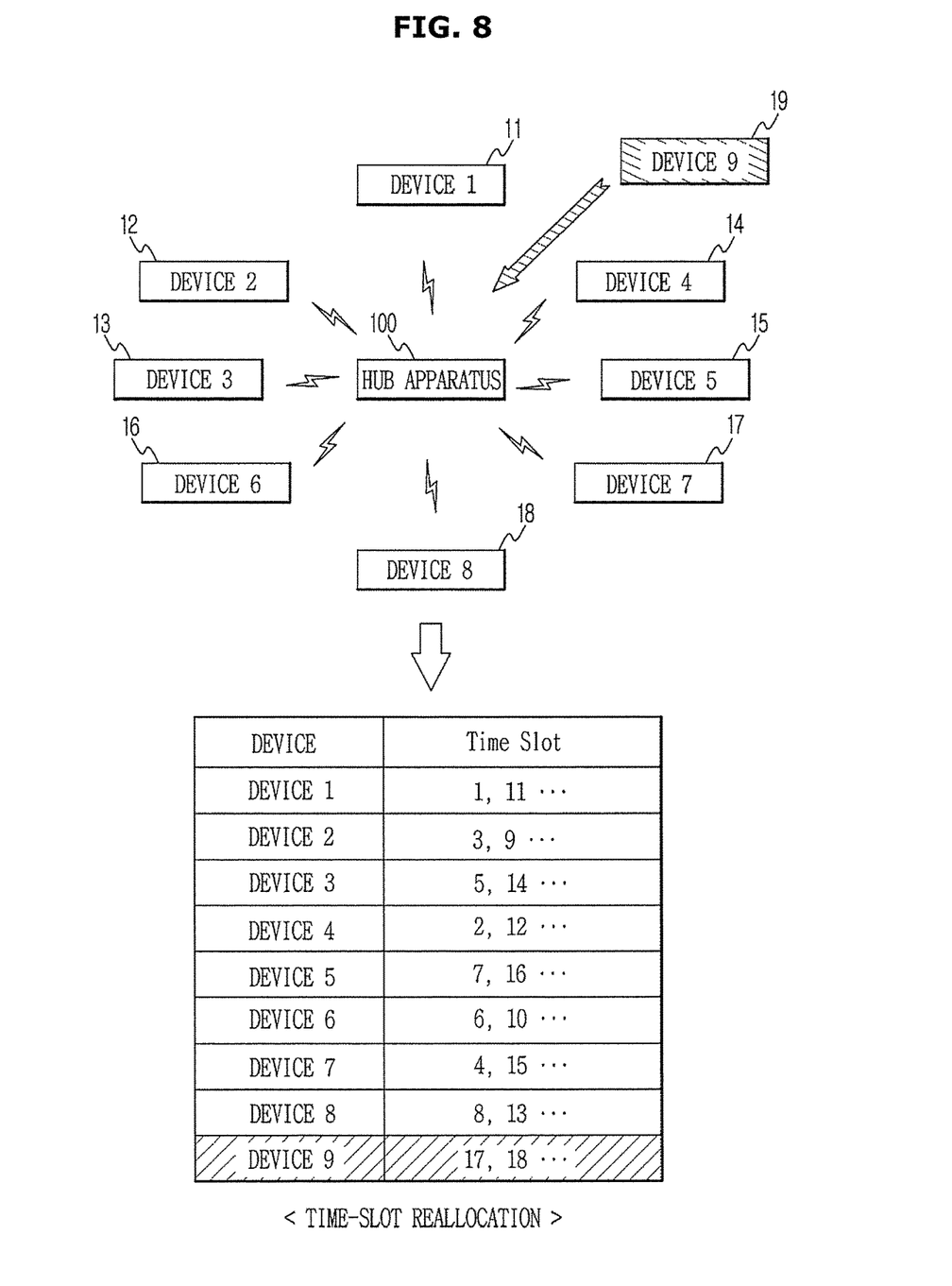
FIG. 8 is a conceptual diagram illustrating a method for redistributing time slots when a new device is connected to the hub device according to an embodiment of the present disclosure.
Figure 9:
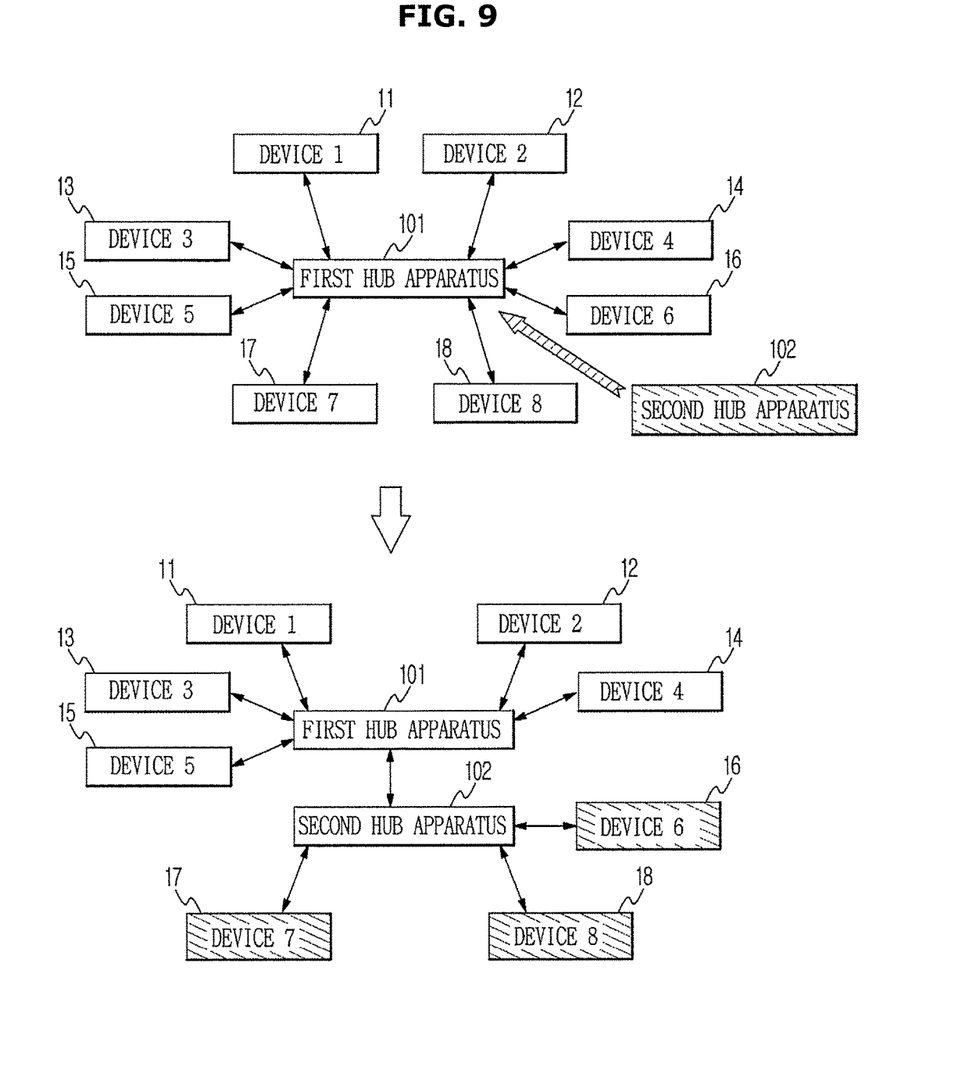
FIG. 9 is a conceptual diagram illustrating the connection relationship among a conventional hub device, a new hub device, and devices when the new hub device is added.
Figure 10:
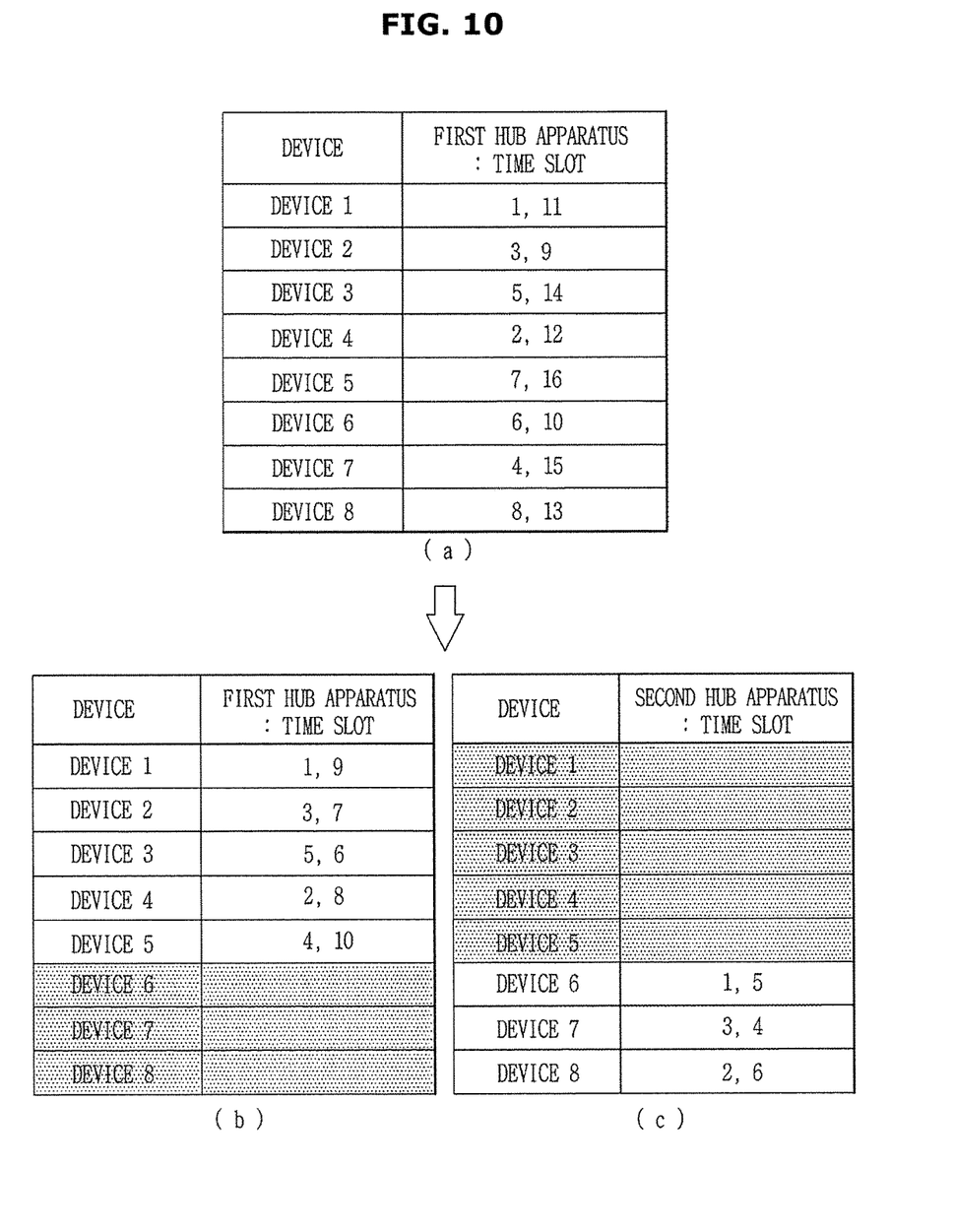
FIG. 10 is a table illustrating a method for redistributing time slots when a new hub device is added.
Figure 11:
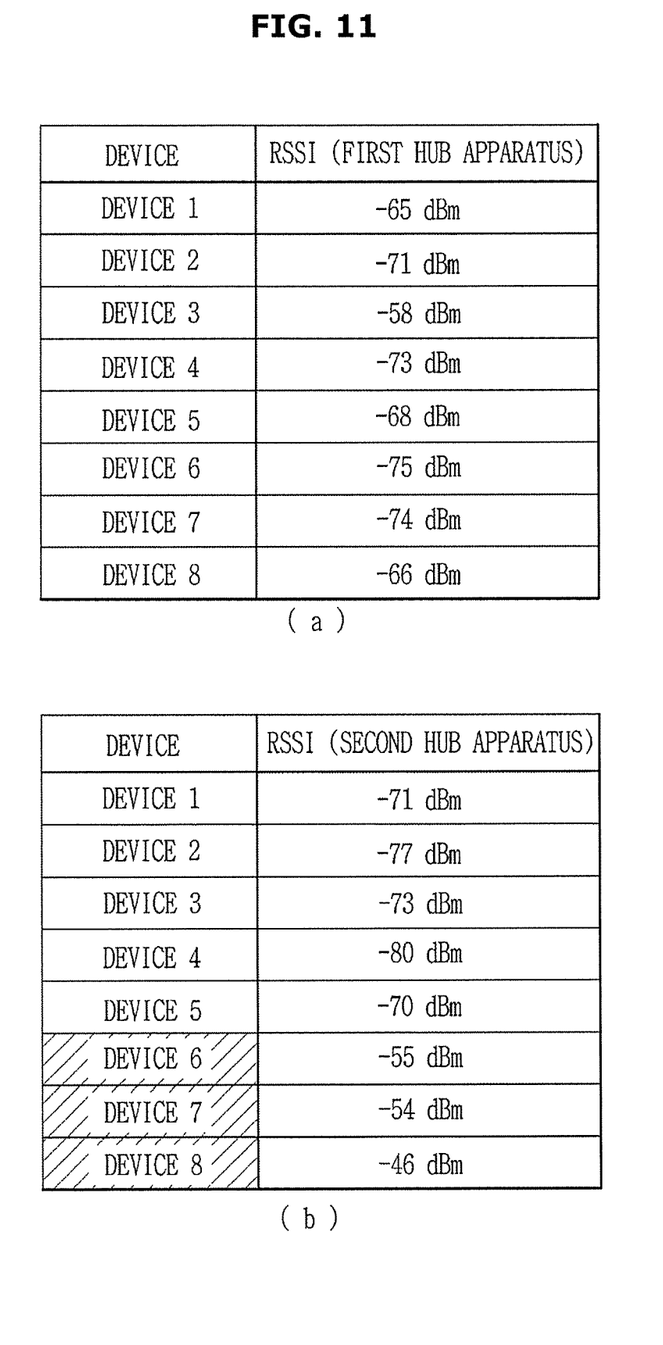
FIG. 11 is a table illustrating Received Signal Strength Indicator (RSSI) between at least one hub device and at least one device when a new hub device is added.

FIG. 6 is a flowchart illustrating a method for redistributing time slots of the hub device using a new device when the new device is connected to the hub device according to an embodiment of the present disclosure. FIG. 7 is a flowchart illustrating the connection relationship among a conventional hub device, a new hub device, and devices and a method for redistributing time slots when the new hub device is added. FIG. 8 is a conceptual diagram illustrating a method for redistributing time slots when a new device is connected to the hub device according to an embodiment of the present disclosure. FIG. 9 is a conceptual diagram illustrating the connection relationship among a conventional hub device, a new hub device, and devices when the new hub device is added. FIG. 10 is a table illustrating a method for redistributing time slots when a new hub device is added. FIG. 11 is a table illustrating RSSI between at least one hub device and at least one device when a new hub device is added.

Referring to FIG. 6, the communicator 110 of the hub device 100 may receive a communication signal from at least one device (Operation 200). That is, as shown in FIG. 2, at least one device connected to the hub device 100 may be connected to the network server through the hub device 100, or devices may communicate with each other through the hub device 100. The controller 120 may allocate time slots to at least one device connected to the hub device 100 (Operation 210). In this case, the time slots may be equally distributed to the plurality of devices, and the time interval may be equally distributed to time slots.

If a new device is connected to the hub device 100, in addition to the at least one device pre-connected to the hub device 100, the communicator 110 of the hub device 100 may receive a communication signal from the newly added device (Operation 220).

Referring to FIG. 8, besides devices (Device 1 (11) to Device 8 (18)) pre-connected to the hub device 100, a new device (Device 9) 19 may be added to the hub device 100. If Device 9 (19) is added and connected to the hub device 100, a state change such as noise may occur in a communication state of Device 1 (11) to Device 8 (18) pre-connected to the hub device 100.

The controller 120 may detect the state change of the plurality of devices (Device 1 (11) to Device 8 (18)), and has to reallocate time slots of both a new device (Device 9) 19 and the plurality of devices connected to the hub device 100.

The controller 120 may block communication between the hub device 100 and at least one device including the newly added device (Device 9) 19 (Operation 230).

The controller 120 may reallocate time slots of the hub device 100 to at least one device including the new device (Device 9) 19. In this case, as shown in FIGS. 5A and 5B, as described above, the controller 120 may change the number of time slots to be reallocated to each device according to the communication frequency and the use amount of time slots of each device connected to the hub device 100 (Operation 240). Data related to the communication frequency and the use amount of time slots of the devices may be determined on the basis of data stored in the memory 130.

The controller 120 may transmit a control signal for reallocating time slots of the hub device 100 to at least one device having the new device (Device 9) 19 (Operation 250), such that time slots for at least one device connected to the hub device 100 may be reallocated (Operation 260).

Referring to FIG. 8, when time slots of the hub device 100 are reallocated, the controller 120 may also allocate the same number of time slots to the at least one device as necessary. That is, as can be seen from FIG. 5A, if there is a difference in either communication frequency or use amount of time slots between the devices connected to the hub device 100, the number of time slots to be allocated may be changed. Otherwise, time slots may be equally allocated, i.e., the same number of time slots may be allocated. As can be seen from FIG. 8, the same number of time slots may be allocated to the new device (Device 9) 19 in the same manner as in the other pre-connected devices, such that time slots 17 and 18 are allocated to the new device (Device 9) 19.

Referring to FIG. 7, the communicator 110 may receive a communication signal from a conventional hub device (hereinafter referred to as a first hub device), and may also receive a communication signal from at least one new hub device (hereinafter referred to as a second hub device) (Operation 300).

That is, as can be seen from FIG. 9, if devices (Device 1 to Device 8) are connected to the first hub device 101, a new second hub device 102 may be additionally connected. If the second hub device 102 is additionally connected, a state change such as noise may occur in a communication state of the plurality of devices (Device 1 (11) to Device 8 (18)) connected to the first hub device 101, the controller 120 of the hub device 100 may determine which one of the first hub device 101 and the second hub device 102 will be connected to devices (Device 1 (11) to Device 8 (18)).

If a new second hub device 102 is added, a hub device to be connected to devices (Device 1 (11) to Device 8 (18)), that have already been connected to the first hub device 101, may be changed according to a communication signal strength or connection distance between each device and the first hub device 101 or the second hub device 102.

The controller 120 may block communication between at least one device and the first hub device 101 (Operation 310). The controller 120 may compare each of the communication signal strength between at least one device and the first hub device 101 and the communication signal strength between at least one device and the second hub device 102 with data related to the communication signal strength pre-stored in the memory 130 (Operation 320).

In this case, the communication signal strength may be a Received Signal Strength Indication or Received Signal Strength Indicator (RSSI). The memory 130 may store data regarding predetermined communication signal strengths of devices connected to the hub device 100. The controller 120 may determine whether the communication signal strength of at least one device is higher or lower than a predetermined communication signal strength, such that the controller 120 may determine whether the at least one device will be connected to the first hub device 101 or the second hub device 102 on the basis of the result of determination.

That is, when the communication signal strength of the device is higher than a communication signal strength predetermined between the device and the first hub device 101 and is lower than a communication signal strength predetermined between the device and the second hub device 102, the controller 120 may decide to connect the device to the first hub device 101. In addition, the controller 120 may allocate time slots of the first hub device 101 to the device.

In contrast, when the communication signal strength of the device is lower than a communication signal strength predetermined between the device and the first hub device 101 and is higher than a communication signal strength predetermined between the device and the second hub device 102, the controller 120 may determine to connect the device to the second hub device 102. In addition, the controller 120 may allocate time slots of the second hub device 102 to the device.

A difference in communication signal strength between the device and the first hub device 101 may depend on a distance between the device and the first hub device 101, or a difference in communication signal strength between the device and the second hub device 102 may depend on a distance between the device and the second hub device 102.

The controller 120 may compare the communication signal strength between at least one device and the first hub device 101 with a communication signal strength between at least one device and the second hub device 102 (Operation 330). The controller 120 may determine whether the communication signal strength between at least one device and the first hub device 101 is higher than a communication signal strength between at least one device and the second hub device 102 (Operation 340).

FIG. 11(*a*) is a table illustrating communication signal strengths (RSSIs) between the first hub device 101 and each of devices (Device 1 (11) to Device 8 (18)), and FIG. 11(*b*) is a table illustrating communication signal strengths (RSSIs) between the second hub device 102 and each of devices (Device 1 (11) to Device 8 (18)).

Referring to FIG. 11, RSSI between the first hub device 101 and each of the devices (Device 1 (11) to Device 5 (15)) is higher than RSSI between the second hub device 102 and each of the devices (Device 1 (11) to Device 5 (15)). In contrast, RSSI between the second hub device 102 and each of the devices (Device 6 (16) to Device 8 (18)) is higher than RSSI between the first hub device 101 and each of the devices (Device 6 (16) to Device 8 (18)).

Prior to addition of the second hub device 102, at least one device is connected to the first hub device 101. In contrast, after addition of the second hub device 102, devices (Device 1 (11) to Device 8 (18)) are affected by the first hub device 101 and the second hub device 102, such that RSSI values of the respective devices may be changed.

The reason why the RSSI value between the first hub device 101 and each of the devices (Device 1 (11) to Device 5 (15)) is higher than the RSSI value between the second hub device 102 and each of the devices (Device 1 (11) to Device 5 (15)) is that the distance between the first hub device 101 and each of the devices (Device 1 (11) to Device 5 (15)) is shorter than the distance between the second hub device 102 and each of the devices (Device 1 (11) to Device 5 (15)).

Likewise, the reason why the RSSI value between the second hub device 101 and each of the devices (Device 6 (16) to Device 8 (18)) is higher than the RSSI value between the first hub device 101 and each of the devices (Device 6 (16) to Device 8 (18)) is that the distance between the second hub device 102 and each of the devices (Device 6 (16) to Device 8 (18)) is shorter than the distance between the first hub device 101 and each of the devices (Device 6 (16) to Device 8 (18)).

When the RSSI value between at least one device and the first hub device 101 is higher than the RSSI value between at least one device and the second hub device 102 (Operation 340), the controller 120 may transmit a control signal for reallocating time slots of the first hub device 101 to at least one device (Operation 350).

In other words, the RSSI value between the first hub device 101 and each of the devices (Device 1 (11) to Device 5 (15)) shown in FIG. 11 is higher than the RSSI value between the second hub device 102 and each of the devices (Device 1 (11) to Device 5 (15)), such that each device may be connected to the first hub device 101 and time slots of the first hub device 101 may be reallocated as shown in FIG. 9.

Likewise, when the RSSI value between at least one device and the second hub device 102 is higher than the RSSI value between at least one device and the first hub device 101 (Operation 340), the controller 120 may transmit a control signal for reallocating time slots of the second hub device 102 to at least one device (Operation 355).

In other words, the RSSI value between the second hub device 102 and each of the devices (Device 6 (16) to Device 8 (18)) shown in FIG. 11 is higher than the RSSI value between the first hub device 101 and each of the devices (Device 6 (16) to Device 8 (18)), such that each device may be connected to the second hub device 102 and time slots of the second hub device 102 may be reallocated as shown in FIG. 9.

FIG. 10(a) illustrates that time slots of the first hub device 101 are equally allocated to devices (Device 1 (11) to Device 8 (18)), prior to addition of the second hub device 102.

FIG. 10(b) illustrates that time slots of the first hub device 101 are equally allocated to devices (Device 1 (11) to Device 5 (15)) on the basis of RSSI between each device and the first hub device 101 and RSSI between each device and the second hub device 102, after addition of the second hub device 102.

FIG. 10(c) illustrates that time slots of the second hub devices 102 are equally allocated to devices (Device 6 (16) to Device 8 (18)) on the basis of RSSI between each device and the first hub device 101 and RSSI between each device and the second hub device 102, after addition of the second hub device 102.

The controller 120 of the first hub device 101 may transmit a control signal to the second hub device 102 as described above, and may receive a control signal from the second hub device 102 (Operation 360). Although the above-mentioned embodiment has exemplarily disclosed that the controller 120 of the first hub device 101 determines which one of the first hub device 101 and the second hub device 102 will be connected to at least one device and also determines which one of the first hub device 101 and the second hub device 102 will be used for timeslot allocation, the scope or spirit of the present disclosure is not limited thereto. In the same manner as described above, a controller (not shown) of the second hub device 102 may also determine connection of at least one device and distribution or non-distribution of time slots. Likewise, the controller (not shown) of the second hub device 102 may transmit a control signal to the first hub device 101, and may receive a control signal from the first hub device 101.

In addition, the controller 120 of the first hub device 101 may transmit a control signal to each device, and time slots of the first hub device 101 or the second hub devices 102 may be reallocated to the respective devices on the basis of the control signal (Operation 370).

As described above, when at least one device performs communication by connecting to the hub device 100, if a new device is added, the controller 120 of the hub device 100 may determine the connection relationship between the hub device 100 and at least one device having the added new device, and may reallocate time slots to the at least one device.

In addition, when at least one device performs communication by connecting to the hub device 100, if a new hub device is added, the controller 120 of the hub device 100 may determine the connection relationship among the at least one device, the conventional hub device 100, and the new hub device, and may reallocate time slots to the at least one device. As a result, an efficient communication environment may be implemented in a system connected to a plurality of devices and a plurality of hub devices.

The above-mentioned embodiments may be implemented in the form of a recording medium storing commands capable of being executed by a computer system. The commands may be stored in the form of program code. When the commands are executed by the processor, a program module is generated by the commands so that the operations of the disclosed embodiments may be carried out. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, etc.

As is apparent from the above description, during communication between the at least one hub device and the at least one device, the embodiments of the present disclosure may efficiently manage time slots allocated to each device even when the number of devices increases and the number of hub devices increases, resulting in reduction of information generated in a communication environment. In addition, time slots may be properly allocated to each device, and connection between the at least one hub device and the at least one device is properly distributed, such that an efficient communication environment may be implemented.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A hub apparatus comprising:
   a communicator configured to receive a communication signal from at least one device;
   a controller configured to allocate time slots for the at least one device on the basis of the communication signal received from the at least one device, and when the communicator receives a communication signal from a new device other than the at least one device, transmit a control signal for reallocating time slots for at least one device having the new device; and
   a memory, to which the controller is coupled, configured to store data that is associated with a communication frequency, a use amount of time slots, and a communication signal strength of the at least one device,
   wherein the communicator receives a communication signal from at least one new hub apparatus other than the hub apparatus,
   wherein the hub apparatus is a first hub device and the at least one new hub apparatus includes a second hub device,
   wherein the controller compares each of a communication signal strength between the at least one device and the first hub device and a communication signal strength between the at least one device and the second hub device with data associated with a communication signal strength pre-stored in the memory, and reallocates time slots for the at least one device according to the result of comparison.

2. The hub apparatus according to claim 1, wherein:
when the communicator receives a communication signal from the new device, the controller blocks communication between the at least one device having the new device and the hub apparatus, and reallocates time slots for the at least one device having the new device on the basis of data stored in the memory.

3. The hub apparatus according to claim 1, wherein the controller changes a number of the reallocated time slots on the basis of the communication frequency and the use amount of time slots of the at least one device having the new device.

4. The hub apparatus according to claim 1, wherein:
when the communicator receives a communication signal from the second hub device, the controller blocks communication between the at least one device and the first hub device, and transmits a control signal for reallocating time slots for the at least one device on the basis of data stored in the memory.

5. The hub apparatus according to claim 1, wherein:
when a communication signal strength between the at least one device and the first hub device is higher than a communication signal strength between the at least one device and the second hub device, the controller transmits a control signal for reallocating time slots of the first hub device to the at least one device.

6. The hub apparatus according to claim 1, wherein:
when a communication signal strength between the at least one device and the second hub device is higher than a communication signal strength between the at least one device and the first hub device, the controller transmits a control signal for reallocating time slots of the second hub device to the at least one device.

7. The hub apparatus according to claim 1, wherein:
the communicator transmits the control signal transmitted from the controller to the second hub device, and receives a control signal transmitted from the second hub device in association with time-slot reallocation of the at least one device.

8. A method for controlling a hub apparatus comprising steps of:
receiving, by a communicator, a communication signal from at least one device and a communication signal from at least one new hub apparatus other than the hub apparatus;
allocating, by a controller, time slots for the at least one device on the basis of the communication signal received from the at least one device;
receiving, by the communicator, a communication signal from a new device other than the at least one device; and
transmitting, by the controller, a control signal for reallocating time slots for at least one device having the new device,
wherein the hub apparatus is a first hub device and the at least one new hub apparatus includes a second hub device, and
wherein the step of transmitting the control signal for reallocating the time slots includes:

comparing each of a communication signal strength between the at least one device and the first hub device and a communication signal strength between the at least one device and the second hub device with data associated with a communication signal strength pre-stored in a memory; and
reallocating time slots for the at least one device according to the result of comparison.

9. The method according to claim 8, further comprising:
storing, by the memory, data that is associated with a communication frequency, a use amount of time slots, and a communication signal strength of the at least one device,
wherein the step of transmitting a control signal for reallocating time slots includes:
when receiving a communication signal from the new device, blocking communication between the at least one device having the new device and the hub apparatus, and reallocating time slots for the at least one device having the new device on the basis of the stored data.

10. The method according to claim 8, further comprising:
changing, by the controller, a number of the reallocated time slots on the basis of a communication frequency and a use amount of time slots of the at least one device having the new device.

11. The method according to claim 8, wherein the step of transmitting a control signal for reallocating time slots includes:
when receiving a communication signal from the second hub device, blocking communication between the at least one device and the first hub device, and transmitting a control signal for reallocating time slots for the at least one device on the basis of data stored in a memory.

12. The method according to claim 8, wherein the transmitting the control signal for reallocating the time slots includes:
when a communication signal strength between the at least one device and the first hub device is higher than a communication signal strength between the at least one device and the second hub device, transmitting a control signal for reallocating time slots of the first hub device to the at least one device.

13. The method according to claim 8, wherein the transmitting the control signal for reallocating the time slots includes:
when a communication signal strength between the at least one device and the second hub device is higher than a communication signal strength between the at least one device and the first hub device, transmitting a control signal for reallocating time slots of the second hub device to the at least one device.

14. The method according to claim 8, further comprising:
transmitting the transmitted control signal to the second hub device; and
receiving a control signal transmitted from the second hub device in association with time-slot reallocation of the at least one device.

* * * * *